US012769115B2

(12) United States Patent
Meyer et al.

(10) Patent No.: US 12,769,115 B2
(45) Date of Patent: Oct. 20, 2026

(54) DEVICE FOR MONITORING AN EYE POSITION OF A USER'S EYE IN A VIRTUAL RETINAL DISPLAY, DATA GLASSES, AND METHOD

(71) Applicant: Robert Bosch GmbH, Stuttgart (DE)

(72) Inventors: Johannes Meyer, Haseluenne (DE); Johannes Fischer, Pliezhausen (DE); Thomas Alexander Schlebusch, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 361 days.

(21) Appl. No.: 18/447,131

(22) Filed: Aug. 9, 2023

(65) Prior Publication Data

US 2024/0069333 A1 Feb. 29, 2024

(30) Foreign Application Priority Data

Aug. 23, 2022 (DE) ..................... 10 2022 208 691.0

(51) Int. Cl.
*G02B 27/00* (2006.01)
*G02B 26/10* (2006.01)
*G02B 27/01* (2006.01)
*G06F 3/01* (2006.01)

(52) U.S. Cl.
CPC ......... *G02B 27/0093* (2013.01); *G02B 26/10* (2013.01); *G02B 27/0172* (2013.01); *G06F 3/013* (2013.01)

(58) Field of Classification Search
CPC .. G02B 26/10; G02B 26/101; G02B 27/0093; G02B 27/0172; G02B 27/0179; G02B 2027/0138; G02B 2027/0187; G06F 3/013; A61B 3/113
See application file for complete search history.

(56) References Cited

U.S. PATENT DOCUMENTS 9,846,307 B2 * 12/2017 Tremblay ........... G02B 26/0833
10,698,204 B1 * 6/2020 Ouderkirk .......... G02B 27/0093
11,122,256 B1 * 9/2021 Topliss ............... G02B 27/0172
(Continued)

FOREIGN PATENT DOCUMENTS

DE 102018214637 A1 3/2020
DE 102020206452 A1 11/2021
(Continued)

*Primary Examiner* — Nicholas R. Pasko
(74) *Attorney, Agent, or Firm* — Norton Rose Fulbright US LLP

(57) ABSTRACT

A device for monitoring an eye position of a user's eye in a virtual retinal display. The device includes a laser projector unit generating a collimated scanned infrared laser beam, and an optical system optically guiding the scanned infrared laser beam to the user's eye. The optical system includes an optical element for the scanned infrared laser beam to pass through, or diverting the scanned infrared laser beam. The optical element forms a region in which the collimation of the infrared laser beam is maintained, to generate a bright pupil effect and/or a retina speckle pattern. The optical element forms a second region in which the infrared laser beam is focused on an iris of the user's eye, a center of the user's eye, or a cornea of the user's eye, to generate a glint.

12 Claims, 6 Drawing Sheets

(56) References Cited

U.S. PATENT DOCUMENTS

| | | | | |
|---|---|---|---|---|
| 2012/0105310 | A1* | 5/2012 | Sverdrup | G02B 27/0172 345/8 |
| 2016/0080720 | A1* | 3/2016 | Fullam | A61B 3/14 345/156 |
| 2017/0115483 | A1* | 4/2017 | Aleem | G02B 26/101 |
| 2019/0086674 | A1* | 3/2019 | Sinay | G02B 27/0172 |
| 2019/0187482 | A1* | 6/2019 | Lanman | G02B 26/105 |
| 2020/0142479 | A1* | 5/2020 | Aleem | G02B 27/0093 |
| 2020/0192284 | A1* | 6/2020 | Kim | G03H 1/02 |
| 2021/0011303 | A1* | 1/2021 | Andreev | G02B 27/58 |
| 2022/0155599 | A1* | 5/2022 | Lychagov | G01B 9/02004 |

FOREIGN PATENT DOCUMENTS

| | | | |
|---|---|---|---|
| DE | 102020206822 | A1 | 12/2021 |
| WO | 2021050329 | A1 | 3/2021 |

* cited by examiner

DEVICE FOR MONITORING AN EYE POSITION OF A USER'S EYE IN A VIRTUAL RETINAL DISPLAY, DATA GLASSES, AND METHOD

CROSS REFERENCE

The present application claims the benefit under 35 U.S.C. § 119 of German Patent Application No. DE 10 2022 208 691.0 filed on Aug. 23, 2022, which is expressly incorporated herein by reference in its entirety.

BACKGROUND INFORMATION

PCT Patent Application No. WO 2021/050329 A1 describes a device for monitoring an eye position of a user's eye in a virtual retinal display (retinal scan display), comprising at least one laser projector unit at least for generating a collimated scanned infrared laser beam, and comprising at least one optical system for optically guiding the scanned infrared laser beam to the user's eye.

SUMMARY

The present invention proceeds from a device for monitoring an eye position, in particular measured relative to a reference point, e.g., a pair of data glasses, of a user's eye in a virtual retinal display (retinal scan display), for example the data glasses, comprising at least one laser projector unit at least for generating a collimated scanned infrared laser beam, and comprising at least one optical system for optically guiding the scanned infrared laser beam to the user's eye.

According to an example embodiment of the present invention, it is provided that the optical system comprises an optical element, which is configured for the scanned infrared laser beam to pass through or is configured for diverting the scanned infrared laser beam, wherein the optical element forms a first, in particular spatial or temporal, region in which, in an interaction with the infrared laser beam, the collimation of the infrared laser beam is maintained, in particular to generate a bright pupil effect and/or a retina speckle pattern, preferably in the user's eye, and wherein the optical element forms a second, in particular spatial or temporal, region in which, in the interaction with the infrared laser beam, the infrared laser beam is focused, in particular is focused on an iris of the user's eye, on a center of the user's eye, or preferably on a cornea of the user's eye, to generate a glint. As a result, eye positions can advantageously be monitored in a compact, reliable, and/or cost-effective manner. Advantageously, eye positions can be determined reliably and/or accurately by way of laser feedback interferometry (LFI). This can advantageously make the determination of eye positions less susceptible to interfering light. Advantageously, a gaze vector of a user of the virtual retinal display can be determined in a slippage-robust manner. Advantageously, by ascertaining the bright pupil and the glint by way of a joint infrared laser beam and preferably by way of a joint (LFI) sensor of a laser projector unit, the computational complexity of an evaluation system and thus the energy consumption of this evaluation system can be kept low.

"A pair of data glasses" should in particular be understood as a wearable (head-mounted display), using which information can be added to the field of view of a user. Preferably, data glasses enable augmented-reality and/or mixed-reality applications. Data glasses are commonly also called smart glasses. In particular, the data glasses comprise a virtual retinal display (also called a retinal scan display or a retinal projector), which is in particular familiar to a person skilled in the art. In particular, the virtual retinal display is configured for sequentially rasterizing image content by deflecting at least one light beam, in particular a laser beam of at least one time-modulated light source, for example one or more laser diodes of a laser projector, and for imaging it directly on the retina of the user's eye by optical elements. In particular, the image source is formed as an electronic image source, for example as a graphics output, in particular an (integrated) graphics card, a computer, a processor, or the like. In particular, the image data are formed as color image data, e.g., RGB image data. In particular, the image data can be formed as non-moving or moving images, e.g., videos. In particular, the laser projector unit is provided to generate the image data and output it via a visible (RGB) laser beam. In particular, the laser projector unit comprises RGB laser diodes, which generate the visible laser beam. In particular, the laser projector unit comprises an infrared laser diode, which generates the infrared laser beam. Preferably, the visible laser beams and the infrared laser beam are combined to form a joint laser beam pencil. In this case, the infrared laser diode can be integrated in a laser diode system comprising the RGB laser diodes or the infrared laser beam can be coupled by optical elements into the visible laser beam generated by a separate laser diode system.

Preferably, according to an example embodiment of the present invention, the laser projector unit comprises the (LFI) sensor. In particular, the (LFI) sensor detects and/or analyzes reflected, in particular retroreflected, portions of the laser light output by the laser projector unit, in particular at least the infrared laser beam output by the laser projector unit. A collimated light beam, in particular a laser beam, is in particular a light beam in which each partial beam of the light beam extends in parallel with every other partial beam of the light beam. In particular, the infrared laser beam is scanned, in particular co-scanned, together with the visible laser beam by an optical element, e.g., a MEMS mirror, which generates the image from the virtually punctiform visible laser beam. The optical system of the device comprises at least one optical element, preferably a plurality of optical elements, such as lenses, mirrors, holograms, etc. In particular, the optical system diverts or deflects a beam direction of the infrared laser beam at least once, preferably multiple times. "Provided" and/or "configured" should in particular be understood to mean specially programmed, configured, and/or equipped. An object being provided with a particular function should in particular be understood to mean that the object fulfills and/or performs this particular function in at least one application state and/or operating state.

The bright pupil effect is well known to a person skilled in the art. The bright pupil effect advantageously generates a high iris/pupil contrast, and thus allows the pupil sizes, pupil positions, and/or pupil shapes to be identified with any iris pigmentation. The bright pupil effect is in particular brought about by the phenomenon whereby the retina reflects an increased proportion of incident light when its wavelength in the (infrared) range is approximately 850 nm. In particular, the infrared laser beam is scanned over the user's eye at least using a MEMS micromirror and an optical diverting element of the optical system (e.g., diffractive optics, such as a hologram, a prism, a mirror, a waveguide, etc.). During the scanning process, the optical power of the laser is preferably sampled continuously, in particular by a photodiode integrated in a back reflector of a semiconductor component of the laser projector unit. If the laser beam is incident upon the retina, this results in increased backscattering, since the reflectivity of the retina is greater than the other components of the user's eye, such as the iris, sclera, etc. (keyword: red-eye effect). This advantageously results in amplitude modulation of the optical power of the infrared laser beam for the range in which the infrared laser beam is imaged on the retina of the user's eye through a pupil of the user's eye.

A speckle pattern (also called laser granulation) is in particular an interference phenomenon which has a granular appearance and, with sufficiently coherent illumination, allows optically rough object surfaces, such as the retina of the eye (retina speckle pattern), to be observed. The roughness of the retina is in particular linked to the anatomy of the human eye and behaves in an optically similar manner in everyone. In particular, the back-reflected infrared light used for the evaluation is captured by an infrared detector, which is formed/arranged on-axis with the infrared laser diode. In particular, for the evaluation, the infrared light/retina speckle pattern back-reflected in the laser direction is measured and used. For example, the back-reflected infrared light/retina speckle pattern is captured by a photodiode in the laser projector unit. For example, at least the infrared laser diode or the entire laser projector unit can be configured as a ViP (VCSEL with integrated photodiode).

To determine the glint generated by the user's eye, the focused infrared laser beam is preferably scanned over the user's eye. In this case, the focal position of the laser beam is advantageously on a plane of the cornea of the user's eye. Alternative advantageous focal planes may be an iris plane of the user's eye or the center of the user's eye. A glint in particular occurs when the infrared laser beam and a surface normal of the relevant plane, in particular the plane of the cornea or the iris plane, are exactly in parallel, since, in this case, the emitted light is reflected back to the laser projector unit. In particular since a current position of the infrared laser beam on the user's eye is known owing to the use of a scanner, such as the MEMS micromirror, a position of the glint can be directly determined from the current tilt angles of the scanner. Therefore, a direct relationship can advantageously be established between a glint occurring and a scanner angle at the moment at which said glint occurs. Since the glint correlates with a current position and a current rotation of the cornea, the gaze vector can also be determined thereby, in particular as long as the position of the eye relative to the optical system (optical diverting element and scanner) is known. If, however, the optical system, e.g., the data glasses and/or the virtual retinal display, slips out of position, there is no longer a correlation between the gaze vector and the glint. Therefore, the device for monitoring the eye position also needs to monitor and/or ascertain a center of the pupil in addition to the glint in order to obtain good slippage robustness. In particular, the device for monitoring the eye position forms an eye tracking device, in particular one that operates in a glint-based manner. In particular, it is not possible to determine the center of the pupil by LFI using a focused laser beam. This shortcoming is advantageously overcome by the proposed optical element. In particular, the regions of the optical element can be temporally separate from one another, i.e., the optical element forms the regions successively. In particular, the regions can be spatially separate from one another, i.e., the optical element forms the regions in spatial succession.

According to an example embodiment of the present invention, it is also provided that the optical element is configured as a holographic optical element (HOE) segmented two-dimensionally at least into the two spatial regions. This advantageously allows for different beam shapes of the same infrared laser beam, which can preferably be shone onto the user's eye at virtually the same time. Advantageously, this makes it possible to ascertain the eye position and/or the gaze vector in a cost-effective, compact, and/or energy-saving manner using just one single infrared laser beam. Preferably, individual segments of the two-dimensionally segmented HOE and/or the first and the second spatial region of the optical element are arranged beside one another when viewed perpendicularly to the direction in which the infrared laser beam shines onto the HOE. In particular, the individual segments of the two-dimensionally segmented HOE and/or the first and the second spatial region of the optical element are arranged in a joint plane. In particular, the HOE is configured to be integrated in a diverting element of the optical system of the virtual retinal display, preferably in an eyeglass lens of the data glasses.

If a multitude of first spatial regions and a multitude of second spatial regions are distributed in the HOE in this case, in particular regularly and/or alternately, over the entire surface extent of the HOE, highly accurate eye position monitoring can advantageously be obtained. In particular, a "multitude" of elements includes at least two elements, preferably at least three elements, preferably more than three elements.

If the first spatial regions and the second spatial regions are also distributed over the HOE in this case in the manner of a checkerboard, in a strip-shaped manner, in a regular polygonal pattern, such as a hexagonal pattern, or in another area-filling repeat pattern, in particular one known to a person skilled in the art (also called tessellation in mathematics), a particularly large part of the scanning region, in particular the entire scanning region, over which the infrared laser beam, in particular the laser beam pencil, is scanned, can advantageously be made available for the two eye monitoring methods. Advantageously, the optical element can be configured in a cost-effective manner, in particular without any electronic actuation or the like. When the segmentation pattern of the optical element is known, all the measurement points of the (LFI) sensor can advantageously be split into a (joint) glint signal and a (joint) retinal signal on the basis of the respectively associated tilt of the scanner. The current glint position can then in particular be determined from the glint signal, in particular from a glint image compiled from the glint signal, and the current center of the pupil can then be determined from the retinal signal, in particular from a retinal image compiled from the retinal signal. By combining the current position of the pupil center and the current glint position, the gaze vector can then advantageously be determined in a slippage-robust manner. In general, it is alternatively also possible for the number of pattern elements to merely correspond to a number of regions of the optical element having different optical functions. In particular, the polygonal pattern contains only identical polygons. Alternatively, however, the polygonal pattern can also be formed by non-identical polygons at least in part (Archimedean tessellations, semiregular tessellations, etc.).

In particular, the first spatial regions and the second spatial regions are clearly delimited from one another. Alternatively, however, according to an example embodiment of the present invention, it is also provided that the first spatial regions and the second spatial regions are configured to merge continually into one another. As a result, hard boundary transitions between the focused and collimated infrared laser beam can advantageously be avoided.

In addition, according to an example embodiment of the present invention, it is provided that the device comprises a sensor unit, which is configured for capturing back reflections of the infrared laser beam from the two regions, and a computer unit, which is configured for determining the eye position of the user's eye, in particular at least a gaze vector of the user's eye, from the captured back reflections from the user's eye, in particular from a pupil center position of the user's eye ascertained from the back reflection of the user's eye, and from a glint position of the user's eye ascertained from the back reflection of the user's eye. As a result, eye positions can advantageously be monitored in a compact, reliable, and/or cost-effective manner. Advantageously, eye positions can be determined reliably and/or accurately by way of laser feedback interferometry (LFI). In particular, the sensor unit forms part of the laser projector unit. In particular, the sensor unit is integrated in a laser projector of the laser projector unit. In particular, the sensor unit comprises the (LFI) sensor. In particular, the sensor unit is configured as an LFI sensor. In particular, the sensor unit is configured for capturing the glint. In particular, the sensor unit is configured for capturing the bright pupil. In particular, the sensor unit is configured for capturing the retina speckle pattern. In particular, the sensor unit is provided to capture the back reflections that are shone back into the laser projector unit through the two spatial regions of the optical element. A "computer unit" should in particular be understood as a unit having an information input, information processing, and an information output. Advantageously, the computer unit comprises at least a processor, a memory, input and output means, further electrical components, an operating program, control routines, and/or calculation routines. Preferably, the components of the computer unit are arranged on a joint printed circuit board and/or are advantageously arranged in a joint housing. In particular, the device, preferably the computer unit, is configured for continuously re-determining, and thus in particular tracking, the glint position, the pupil center, and/or the gaze vector.

In addition, according to an example embodiment of the present invention, it is provided that the optical element forms a third, in particular spatial or temporal, region in which the infrared laser beam is focused, in particular is focused on the iris of the user's eye, on the center of the user's eye, or preferably on the cornea of the user's eye, to generate a further glint, wherein the second spatial region and the third spatial region form focal points that are spatially separate from one another, in particular on the cornea of the user's eye. As a result, the eye position, in particular the gaze vector, can advantageously be accurately captured. The third spatial region can advantageously be integrated in the two-dimensional pattern of the HOE.

According to an example embodiment of the present invention, it is also provided that the optical element is configured as a multifocal lens or varifocal lens. As a result, it is advantageously possible to switch between different beam shapes of the infrared laser beam. Advantageously, this makes it possible to ascertain the eye position and/or the gaze vector in a cost-effective, compact, and/or energy-saving manner using just one single infrared laser beam. The multifocal lens or varifocal lens in particular forms the temporal regions. The multifocal lens or varifocal lens can in particular be segmented into the two spatial regions. Preferably, however, the spatial regions overlap on the multifocal lens or varifocal lens, preferably even completely overlap. Therefore, in particular during operation of the device, the multifocal lens or varifocal lens actively, repeatedly, and continuously switches at least between the optical functions of the first (temporal) region (collimation of the infrared laser beam or maintaining the collimation of the infrared laser beam) and the second (temporal) region (focusing of the infrared laser beam) and, where applicable, also the third (temporal) region (focusing of the infrared laser beam on a further focal point). In particular, the multifocal lens or varifocal lens is configured as an electronically actuable lens. In particular, the multifocal lens or varifocal lens is arranged in a beam path of the virtual retinal display between the scanner (MEMS micromirror) and the HOE (eyeglass lens of the data glasses). For example, the multifocal lens or varifocal lens could be configured as a TLens® from poLight® (Skoppum, Norway). Alternatively, an Alvarez lens, a diffractive waveplate, or another electrically controllable or movable lens could also replace the multifocal lens or varifocal lens.

According to an example embodiment of the present invention, if, in this case, the multifocal lens or varifocal lens is adjusted and/or configured such that the scanned infrared laser beam passing through the multifocal lens or varifocal lens is focused during a scan in a scanning direction, in particular in a forward scanning direction, and such that the scanned infrared laser beam remains collimated during a scan in a further scanning direction in the opposite direction to the scanning direction, in particular in a backward scanning direction (flyback of the MEMS micromirror), it is advantageously possible to switch between the regions of the optical element (the adjustments of the multifocal lens or varifocal lens) within standard time scales of multifocal lenses or varifocal lenses, which are advantageously cost-effective. In particular, while a horizontal mirror of the scanner (MEMS micromirror) compiles the image data to be displayed by the virtual retinal display (forward scan), the multifocal lens or varifocal lens is adjusted such that the infrared laser beam is focused (determination of glints). In particular, the multifocal lens or varifocal lens is adjusted such that, during the backward scan (flyback) of the horizontal mirror of the scanner (MEMS micromirror), the infrared laser beam is collimated (determination of the pupil information, in particular the position of the pupil center).

In addition, according to an example embodiment of the present invention, a pair of data glasses, in particular smart glasses, comprising the device, as well as a method for monitoring the eye position of the user's eye in the virtual retinal display (retinal scan display), preferably using the device, are proposed, wherein, in at least one method step, a collimated scanned infrared laser beam is generated, wherein, in at least one further method step, the scanned laser beam is guided to the user's eye via at least one optical system, wherein the optical system comprises an optical element through which the scanned infrared laser beam passes or by which the scanned infrared laser beam is diverted, wherein, when the scanned infrared laser beam passes through or is diverted by the optical element, the collimation of said laser beam is maintained in a first, in particular spatial or temporal, region of the optical element to generate a bright pupil effect and/or a retina speckle pattern, wherein, when the scanned infrared laser beam passes through or is diverted by the optical element, said laser beam is focused on an iris of the user's eye, on a center of the user's eye, or on a cornea of the user's eye in the second, in particular spatial or temporal, region of the optical element to generate a glint, and wherein, in at least one further method step, a reflection signal reflected by the user's eye and comprising a glint, as well as a bright pupil pattern and/or the retina speckle pattern, is evaluated to ascertain the eye position of the user's eye, in particular a gaze vector of the user's eye. As a result, eye positions can advantageously be monitored in a compact, reliable, and/or cost-effective manner. Advantageously, eye positions can be determined reliably and/or accurately by way of laser feed-back interferometry (LFI).

The device according to the present invention, the data glasses according to the present invention, and the method according to the present invention are not intended to be limited to the above-described application and specific embodiment in this case. In particular, to implement a mode of functioning described herein, the device according to the present invention, the data glasses according to the present invention, and the method according to the present invention can have a number of individual elements, components, and units, as well as method steps, which is different from a number mentioned herein. In addition, for the value ranges stated in this disclosure, values within the stated limits should also be taken to be disclosed and applicable in any manner.

BRIEF DESCRIPTION OF THE DRAWINGS

Further advantages will become clear from the following description of the figures. Two exemplary embodiments of the present invention are shown in the figures. The figures and the description herein contain many features in combination. A person skilled in the art would also expediently consider the features in isolation and combine them into further, useful combinations.

DETAILED DESCRIPTION OF EXAMPLE EMBODIMENTS

Figure 1:
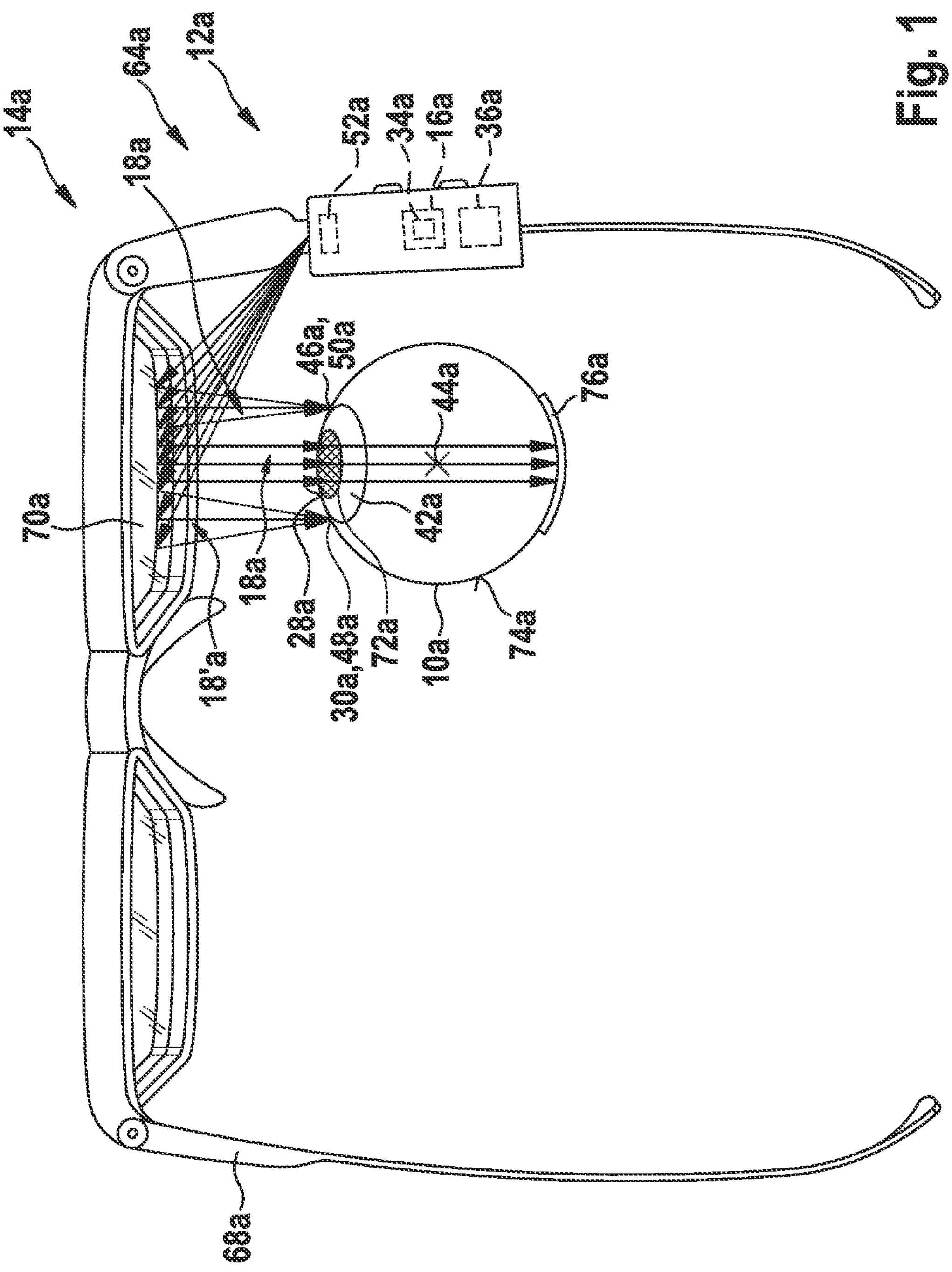
FIG. 1 is a schematic view of a pair of data glasses having a device comprising a virtual retinal display, according to an example embodiment of the present invention.

FIG. 1 is a schematic view of a pair of data glasses 14*a*. The data glasses 14*a* comprise a virtual retinal display (retinal scan display) 12*a*. The data glasses 14*a* have an eyeglass frame 68*a*. The data glasses 14*a* have eyeglass lenses 70*a*. FIG. 1 shows a user's eye 10*a* by way of example. The user's eye 10*a* has a pupil 72*a*. The user's eye 10*a* has an iris 42*a*. The user's eye 10*a* has a center 44*a*. The user's eye 10*a* has a cornea 28*a*. The user's eye 10*a* has a sclera 74*a*. The user's eye 10*a* has a retina 76*a*. The virtual retinal display 12*a* comprises a laser projector unit 16*a*. The laser projector unit 16*a* is configured at least for generating a collimated scanned infrared laser beam 18*a*. The laser projector unit 16*a* outputs a scanned laser beam pencil. The scanned laser beam pencil generates an image display of the virtual retinal display 12*a*. The laser beam pencil contains a visible laser beam and the infrared laser beam 18*a*. For the sake of clarity, FIGS. 1 and 2 each only show the infrared laser beam 18*a*. The laser projector unit 16*a* is integrated in the eyeglass frame 68*a* at least in part. The eyeglass lens 70*a* forms part of the virtual retinal display 12*a* in that it comprises part of an optical system 20*a* of the virtual retinal display 12*a*, e.g., an integrated holographic optical element (HOE) 32*a*. The data glasses 14*a* comprise a device 64*a* for monitoring an eye position of the user's eye 10*a* in the virtual retinal display 12*a*.

Figure 2A:
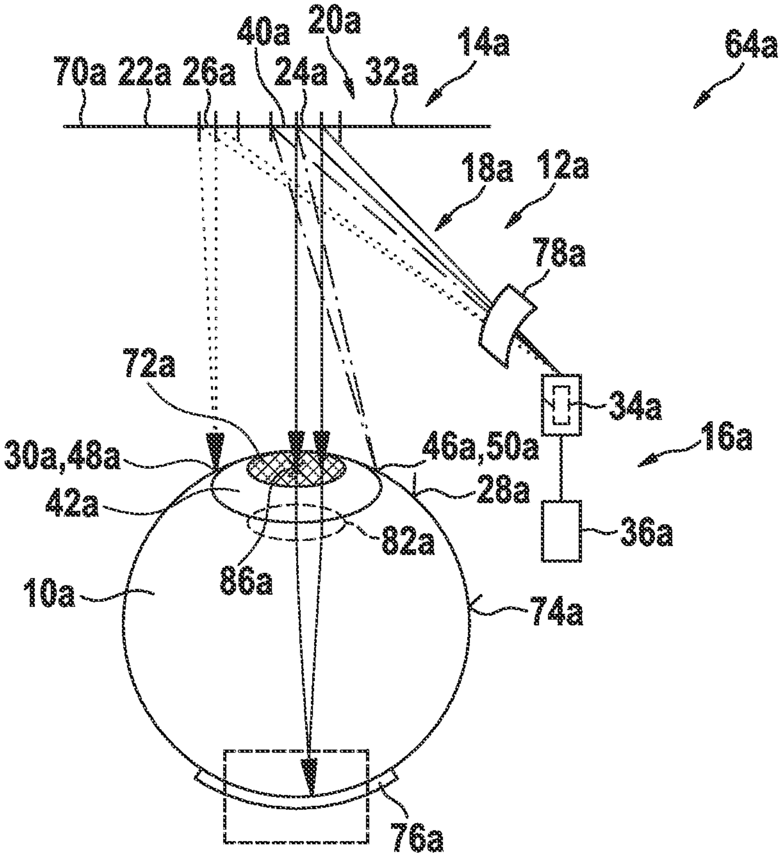
FIG. 2A is a schematic view of the virtual retinal display having an optical system comprising an optical element, according to an example embodiment of the present invention.
Figure 2B:
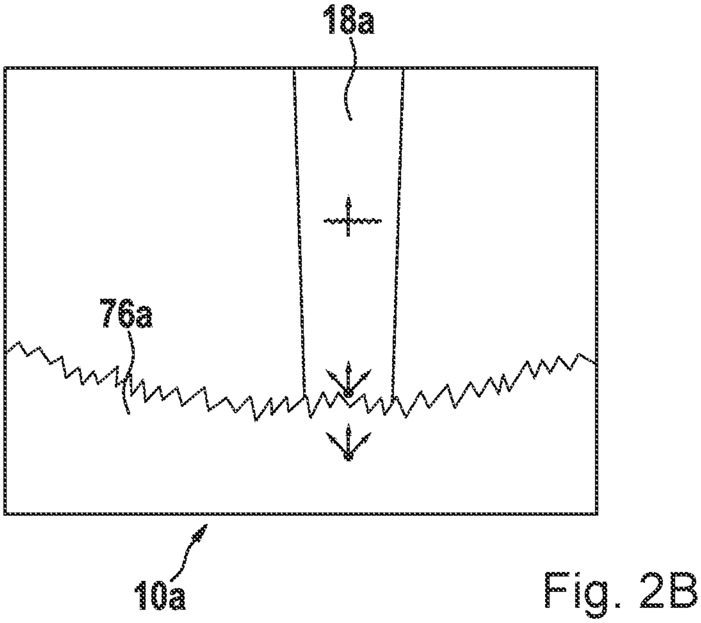
FIG. 2B shows a detail of a user's eye of a user using the data glasses including the user's retina, according to an example embodiment of the present invention.

The device 64*a* comprises the laser projector unit 16*a*. The device 64*a* comprises an optical system 20*a*. FIGS. 2A and 2B schematically outlines the optical system 20*a*. The optical system 20*a* is provided at least for optically guiding the scanned infrared laser beam 18*a* from the laser projector unit 16*a* to the user's eye 10*a*. The optical system 20*a* comprises a lens 78*a*. Alternatively, the optical system 20*a* can also be configured without the lens 78*a*, or with a plurality of lenses. For example, the lens 78*a* can form a segment lens to duplicate an image that is output by the laser projector unit 16*a*. The optical system 20*a* comprises the holographic optical element 32*a*. The holographic optical element 32*a* forms a diverting element, which is provided to divert the laser beam pencil output by the laser projector unit 16*a* to the user's eye 10*a*. The holographic optical element 32*a* is integrated in one of the eyeglass lenses 70*a* of the data glasses 14*a*.

The device 64*a* comprises a sensor unit 34*a*. The sensor unit 34*a* is configured as a laser feedback interferometry (LFI) sensor. The sensor unit 34*a* is integrated in the laser projector unit 16*a*. The sensor unit 34*a* is configured for capturing back reflections of the infrared laser beam 18*a* (cf. FIG. 2B) from the user's eye 10*a*. The device 64*a* comprises a computer unit 36*a*. The computer unit 36*a* is configured for evaluating the captured back reflections from the user's eye 10*a*. The computer unit 36*a* is configured for tracking and/or monitoring an eye position of the user's eye 10*a* from the captured back reflections from the user's eye 10*a*. The computer unit 36*a* is configured for determining a gaze vector 38*a* of the user's eye 10*a* (cf. FIG. 4) from the captured back reflections from the user's eye 10*a*.

Figure 3A:
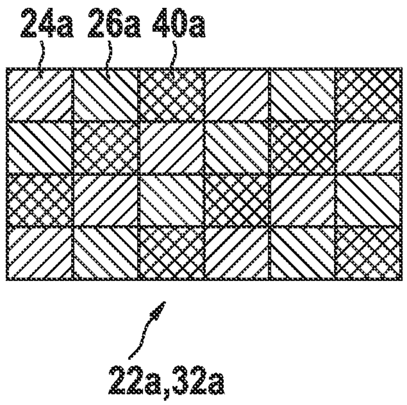
FIG. 3A shows a first exemplary configuration of the optical element configured as a holographic optical element, according to the present invention.
Figure 3B:
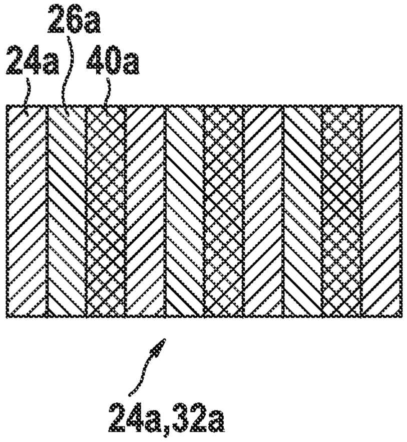
FIG. 3B shows a second exemplary configuration of the optical element configured as a holographic optical element, according to the present invention.
Figure 3C:
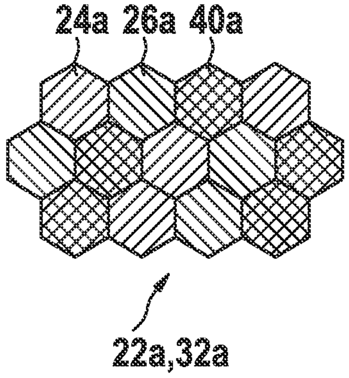
FIG. 3C shows a third exemplary configuration of the optical element configured as a holographic optical element, according to the present invention.

The optical system 20*a* comprises an optical element 22*a*. The optical element 22*a* is configured for diverting the scanned infrared laser beam 18*a*. The optical element 22*a* is formed by the HOE 32*a* in the exemplary embodiment shown in FIGS. 2A and 2B. The optical element 22*a* forms a first spatial region 24*a*. The optical element 22*a* forms a second spatial region 26*a*. The optical element 22*a* forms a third spatial region 40*a*. The optical element 22*a* is configured to be segmented two-dimensionally into the spatial regions 24*a*, 26*a*, 40*a*. A multitude of first spatial regions 24*a* are regularly distributed in the HOE 32*a* over the entire surface extent of the HOE 32*a*. A multitude of second spatial regions 26*a* are regularly distributed in the HOE 32*a* over the entire surface extent of the HOE 32*a*. A multitude of third spatial regions 40*a* are regularly distributed in the HOE 32*a* over the entire surface extent of the HOE 32*a*. The different spatial regions 24*a*, 26*a*, 40*a* are distributed over the HOE 32*a* in an area-filling repeat pattern. In this case, the different spatial regions 24*a*, 26*a*, 40*a* can be distributed over the HOE 32*a* in the manner of a checkerboard (cf. FIG. 3A), in a strip-shaped manner (cf. FIG. 3B), or in a regular polygonal pattern, such as a hexagonal pattern (cf. FIG. 3C). In this case, the spatial regions 24*a*, 26*a*, 40*a* can be configured to be clearly separated from one another or to merge continually into one another. In addition, there can also be more or less than three, but at least two, two-dimensionally segmented spatial regions 24*a*, 26*a*, 40*a*.

In the first spatial region 24*a*, the optical element 22*a* has an optical function by which, in an interaction with the infrared laser beam 18*a*, the collimation of the infrared laser beam 18*a* is maintained. By maintaining the collimation, at least one part of a part[1] of the infrared laser beam 18*a* reflected by the first spatial region 24*a* of the HOE 32*a* penetrates the user's eye 10*a*, where it is reflected by the retina 76*a* of the user's eye 10*a*. As a result, a bright pupil effect is generated. As a result, a retina speckle pattern 62*a* is generated (cf. FIG. 4). The part of the infrared laser beam 18*a* penetrating the user's eye 10*a* penetrates the cornea 28*a* and is focused on the retina 76*a* by an eye lens 82*a* of the user's eye 10*a*. Here, the coherent wavefront of the infrared laser beam 18*a* that has penetrated impinges on the surface of the retina 76*a*. Part of the incoming wavefront is directly reflected by the surface of the retina 76*a*. In this case, the wavefront of the reflected wavefront 84*a* is also distorted by the rough surface of the retina 76*a* due to the signal propagation times. Another portion of the infrared laser beam 18*a* that has penetrated enters upper tissue layers of the retina 76*a* and is only reflected from there. In this case, there is also distortion of the back-reflected wavefront 84*a*. These two effects bring about constructive and/or destructive interference of the back reflection signal. As a result, bright speckle and dark speckle (the retina speckle pattern 62*a*) are formed in the signal from the sensor unit 34*a* with a normal distribution in the region of the reflecting retina 76*a*, and this renders the shape and size of the pupil 72*a* apparent.

[1] [Translator's note: one of the instances of "part" is possibly superfluous here, there being a grammatical error in the German, but it has been translated as seen.]

These effects are utilized to ascertain a pupil center 86*a* (cf. FIG. 2A) using the computer unit 36*a*. To determine the pupil center 86*a*, a mathematical function is first fitted to the image. In this case, a particularly advantageous function is a multivariate Gaussian distribution, since this describes the shape of the pupil 72*a* (ellipse/circle) particularly well and takes the underlying physical operating principle (speckling with normal distribution) into account in the process. Other functions that can be used are circles and ellipses, or square functions. To fit the Gaussian function, the first-order and second-order image moments are determined. The image moments can generally be determined by formula (1).

$$M_{i,j} = \sum_x \sum_y x^i y^j I(x, y) \tag{1}$$

From the moments M10, M01, and M00 that can be determined by formula (1), an image focal point and thus a midpoint of the Gaussian distribution, and therefore the pupil center 86*a*, are then determined by way of formula (2).

$$\{\bar{x}, \bar{y}\} = \left\{\frac{M_{10}}{M_{00}}, \frac{M_{01}}{M_{00}}\right\} \tag{2}$$

In addition to this method for determining the pupil center 86*a*, other methods can also be used, such as neural networks (segmentation networks, e.g., U-Nets), statistical regressors such as a Bayes estimator, or neuromorphic operators. Furthermore, methods from the field of correlation are possible, wherein a known pupil function is convoluted with the image that can be created from the signal from the sensor unit 34*a*, and the center of the pupil 72*a* is ascertained therefrom.

In the second spatial region 26*a*, the optical element 22*a* has an optical function by which, in the interaction with the infrared laser beam 18*a*, the infrared laser beam 18*a* is focused on a first focal point 48*a*. The first focal point 48*a* can be on the iris 42*a* of the user's eye 10*a*, in the center 44*a* of the user's eye 10*a*, or on the cornea 28*a* of the user's eye 10*a*. By appropriate focusing, the glint 30*a* is generated, in particular in the sensor signal from the sensor unit 34*a* that is received back from the second spatial region 26*a*. All the second spatial regions 26*a* having the same optical function focus the infrared laser beam 18*a* on the same point on the user's eye 10*a*, in particular on the glint 30*a*.

In the third spatial region 40*a*, the optical element 22*a* has an optical function by which, in the interaction with the infrared laser beam 18*a*, the infrared laser beam 18*a* is focused on a second focal point 50*a*. The second focal point 48*a* can likewise be on the iris 42*a* of the user's eye 10*a*, in the center 44*a* of the user's eye 10*a*, or on the cornea 28*a* of the user's eye 10*a*. By appropriate focusing, the further glint 46*a* is generated, in particular in the sensor signal from the sensor unit 34*a* that is received back from the third spatial region 40*a*. The further glint 46*a* is arranged to be spatially separate from the glint 30*a*, in particular in the sensor signal from the sensor unit 34*a* and/or on the user's eye 10*a*. All the third spatial regions 40*a* having the same optical function focus the infrared laser beam 18*a* on the same point on the user's eye 10*a*, in particular on the further glint 46*a*. The focal points 48*a*, 50*a* are spatially separate from one another on the user's eye 10*a*.

Figure 4:
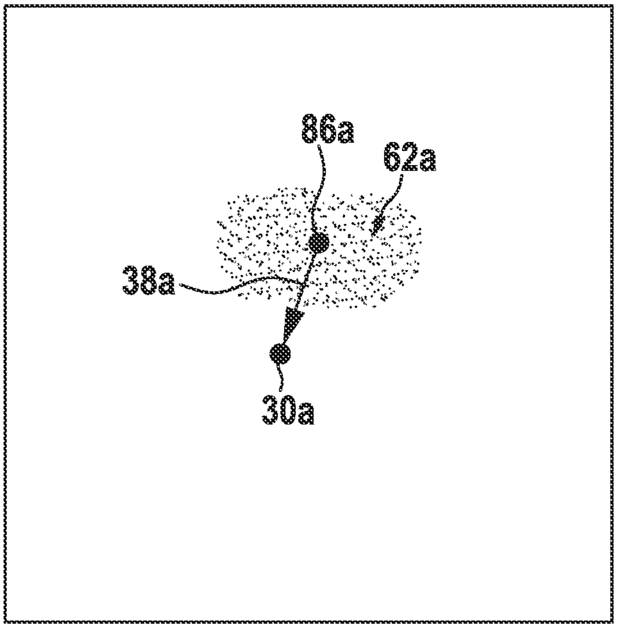
FIG. 4 shows an exemplary image of a sensor signal from a sensor unit of the device, according to the present invention.

The sensor unit 34*a* is configured for capturing the back reflections of the infrared laser beam 18*a* from all the spatial regions 24*a*, 26*a*, 40*a*. The computer unit 36*a* is configured for determining the eye position of the user's eye 10*a* and/or the gaze vector 38*a* of the user's eye 10*a* from the pupil center position of the user's eye 10*a* ascertained from the back reflection of the user's eye 10*a* and from the glint positions of the glints 30*a*, 46*a* on the user's eye 10*a*, which glint positions are ascertained from the back reflection of the user's eye 10*a*. FIG. 4 shows an exemplary image of a sensor signal from the sensor unit 34*a*. The back reflection signals which have been generated by the back reflection of the infrared laser beam 18*a* by the user's eye 10*a* and have passed through the optical system 20*a* in the backward direction as far as the sensor unit 34*a* are imaged in the image. The retina speckle pattern 62*a* generated by the retina 76*a* can be seen in the image of the sensor signal. The pupil center 86*a* read out from the retina speckle pattern 62*a* by fitting can be seen in the image of the sensor signal. The glint 30*a* can be seen in the image of the sensor signal. The gaze vector 38*a* ascertained from the glint 30*a* and the pupil center 86*a* can be seen in the image of the sensor signal.

Figure 5:
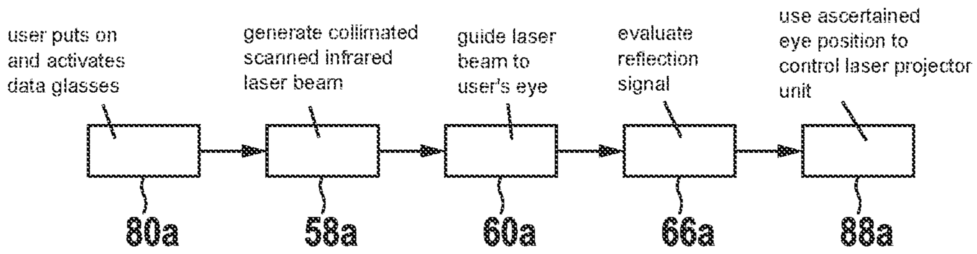
FIG. 5 is a schematic flow diagram of a method for monitoring an eye position of the user's eye in the virtual retinal display of the data glasses.

FIG. 5 is a schematic flow diagram of a method for monitoring the eye position of the user's eye 10*a* in the virtual retinal display 12*a* of the data glasses 14*a*. In at least one method step 80*a*, the user puts on and activates the data glasses 14*a*. In at least one further method step 58*a*, the collimated scanned infrared laser beam 18*a* is generated by the laser projector unit 16*a*. In at least one further method step 60*a*, the scanned infrared laser beam 18*a* is guided to the user's eye 10*a* via the optical system 20*a* comprising the optical element 22*a*. In the process, the scanned infrared laser beam 18*a*, 18*b* passes through the optical element 22*b* (cf. FIG. 6) or is diverted by the optical element 22*a* (cf. FIGS. 2A and 2B). In this case, when the scanned infrared laser beam 18*a*, 18*b* passes through or is diverted by the optical element 22*a*, 22*b*, the collimation of said laser beam is maintained in a first spatial or temporal region 24*a*, 24*b* of the optical element 22*a*, 22*b* to generate a bright pupil effect and/or a retina speckle pattern 62*a*, 62*b*. In this case, when the scanned infrared laser beam 18*a*, 18*b* passes through or is diverted by the optical element 22*a*, 22*b*, said laser beam is focused on an iris 42*a* of the user's eye 10*a*, on a center 44*a* of the user's eye 10*a*, or on a cornea 28*a* of the user's eye 10*a* in the second spatial or temporal region 26*a*, 26*b* of the optical element 22*a*, 22*b* to generate a glint 30*a*.

In at least one further method step 66*a*, a reflection signal reflected by the user's eye 10*a* and comprising the glint 30*a*, as well as the bright pupil pattern and/or the retina speckle pattern 62*a*, is evaluated to ascertain the eye position of the user's eye 10*a*. In the method step 66*a*, the reflection signal is evaluated to ascertain the gaze vector 38*a* of the user's eye 10*a*. In at least one further method step 88*a*, the ascertained eye position is used by the computer unit 36*a* to control the laser projector unit 16*a* or another part of the data glasses 14*a*.

FIGS. 6 to 8B show a further exemplary embodiment of the present invention. The following descriptions and these figures are essentially limited to the differences between the exemplary embodiments, and, for components with the same designation, in particular components having identical reference signs, reference can in principle be made to the drawings and/or the description of the other exemplary embodiments, in particular FIGS. 1 to 5. To differentiate the exemplary embodiments, the letter a has been added to the reference signs for the exemplary embodiment in FIGS. 1 to 5. In the exemplary embodiments in FIGS. 6 to 8*b*, the letter a has been replaced with the letter b.

Figure 6:
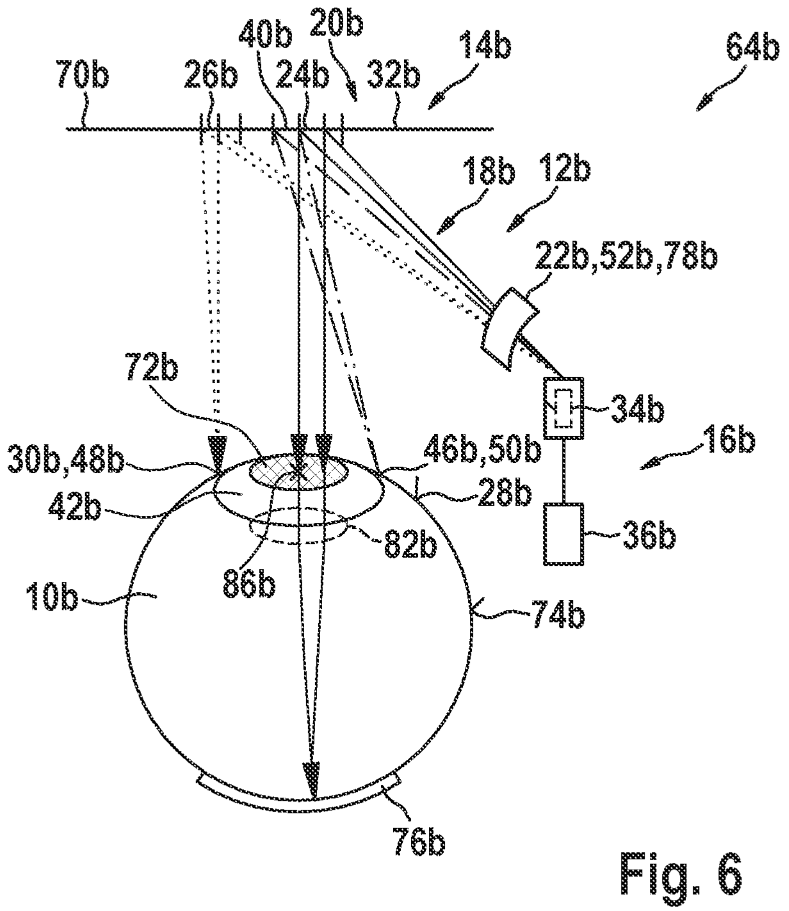
FIG. 6 is a schematic view of a virtual retinal display of an alternative device comprising an alternative optical system, which has an optical element, of the alternative device, according to the present invention.
Figure 7:
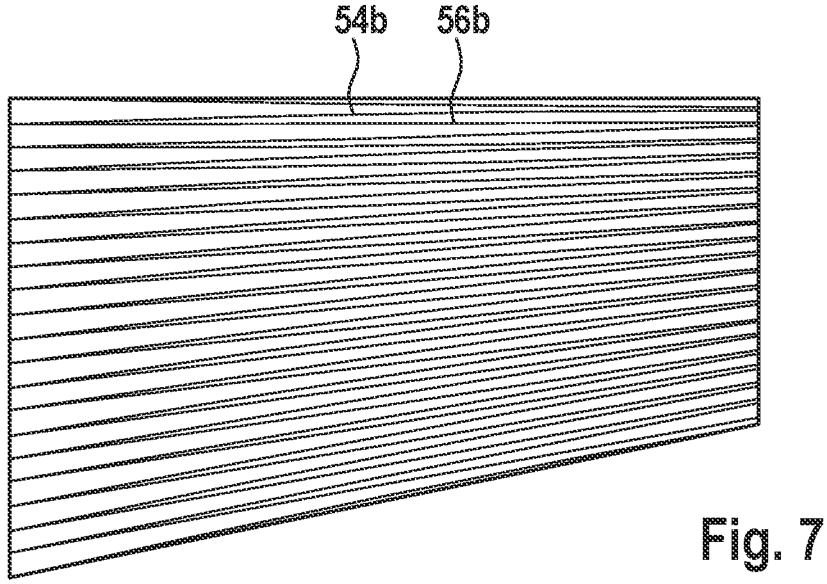
FIG. 7 shows an exemplary scan diagram for a laser beam pencil of a laser projector unit of the alternative device, according to the present invention.
Figure 8A:
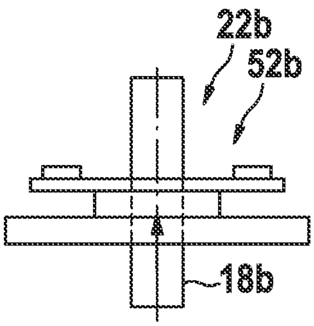
FIG. 8A is a schematic view of the optical element, configured as a multifocal lens, of the alternative optical system in a first, non-focusing adjustment position, according to the present invention.
Figure 8B:
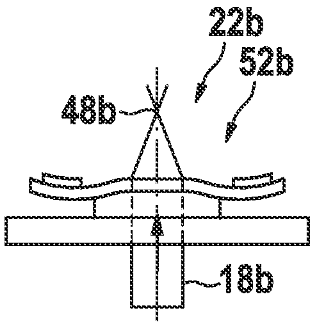
FIG. 8B is a schematic view of the optical element, configured as a multifocal lens, of the alternative optical system in a second, focusing adjustment position, according to the present invention.

FIG. 6 schematically outlines an alternative optical system 20*b* of an alternative device 64*b* for monitoring an eye position of a user's eye 10*b* in a virtual retinal display 12*b*. The optical system 20*b* is provided at least for optically guiding a scanned infrared laser beam 18*b* from a laser projector unit 16*b* of the alternative device 64*b* to the user's eye 10*b*. The optical system 20*b* comprises a lens 78*b*. The optical system 20*b* comprises a holographic optical element (HOE) 32*b*. The lens 78*b* is arranged between the laser projector unit 16*b* and the HOE 32*b* in the beam path of the infrared laser beam 18*b*. The holographic optical element 32*b* forms a diverting element, which is provided to divert the laser beam pencil output by the laser projector unit 16*b* to the user's eye 10*b*. The holographic optical element 32*b* is integrated in an eyeglass lens 70*b* of a pair of data glasses 14*b* comprising the device 64*b*.

The alternative optical system 20*b* comprises an optical element 22*b*. The optical element 22*b* is configured for the scanned infrared laser beam 18*b* to pass therethrough. The optical element 22*b* is formed by the lens 78*b* in the exemplary embodiment shown in FIG. 6. The lens 78*b* is configured as a multifocal lens 52*b*. The multifocal lens 52*b* is controllable. By controlling the multifocal lens 52*b*, a degree of focusing of the multifocal lens 52*b* can be adjusted. The degree of focusing can be variably adjusted from no focusing (cf. FIG. 8A) to focusing with different focal points 48*b* (cf. FIG. 8B). The alternative device 64*b* comprises a computer unit 36*b*. The computer unit 36*b* is provided to control the multifocal lens 52*b*. The optical element 22*b* forms a first spatial or temporal region 24*b*. The optical element 22*b* forms a second spatial or temporal region 26*b*. The optical element 22*b* forms a third spatial or temporal region 40*b*. The spatial regions 24*b*, 26*b*, 40*b* of the optical element 22*b* configured as a multifocal lens 52*b* overlap spatially. The temporal regions 24*b*, 26*b*, 40*b* of the optical element 22*b* configured as a multifocal lens 52*b* do not overlap temporally. Adjusting the multifocal lens 52*b* can temporally or spatially vary which of the optical functions assigned to the spatial or temporal regions 24*b*, 26*b*, 40*b* is currently active. In addition, the multifocal lens 52*b* can also be configured to be segmented.

The multifocal lens 52*b* is adjusted and/or configured such that the scanned infrared laser beam 18*b* passing through the multifocal lens 52*b* is focused during a scan in a first scanning direction 54*b*, which constitutes a forward scanning direction. During the scan in the first scanning direction 54*b* (cf. FIG. 7), the optical function of the first spatial or temporal region 24*b* is thus configured by the multifocal lens 52*b*. The multifocal lens 52*b* is also adjusted and/or configured such that the scanned infrared laser beam 18*b* passing through the multifocal lens 52*b* remains unchanged and/or collimated during a scan in a second scanning direction 56*b* (cf. FIG. 7), which constitutes a backward scanning direction. During the scan in the second scanning direction 56*b*, the optical function of the second spatial or temporal region 26*b* is thus configured by the multifocal lens 52*b*.

What is claimed is:

1. A device for monitoring an eye position of a user's eye in a virtual retinal display, comprising:

at least one laser projector configured at least to generate a collimated scanned infrared laser beam;

at least one optical system configured to optically guide the scanned infrared laser beam to the user's eye, the optical system includes an optical element configured for the scanned infrared laser beam to pass through or is configured for diverting the scanned infrared laser beam, wherein the optical element is configured to form a first spatial or temporal region in which, in an interaction with the infrared laser beam, the optical element has a first optical function by which the collimation of the infrared laser beam is maintained, to generate a bright pupil effect and/or a retina speckle pattern, and wherein the optical element is configured to form a second spatial or temporal region in which, in the interaction with the infrared laser beam, the optical element has a second optical function by which the infrared laser beam is focused on an iris of the user's eye, or on a center of the user's eye, or on a cornea of the user's eye, to generate a glint, wherein the at least one laser projector includes a laser feedback interferometry sensor configured to detect back reflections of the infrared laser beam from the user's eye, the laser feedback interferometry sensor being integrated in the laser projector, wherein the infrared laser beam is combined with at least one visible laser beam to form a joint laser beam pencil, the infrared laser beam being generated by an infrared laser diode integrated with or optically coupled to the visible laser beam.

2. The device as recited in claim 1, wherein the virtual retina display include data glasses.

3. The device as recited in claim 1, wherein the laser feedback interferometry sensor is further configured to capture back reflections of the infrared laser beam from the user's eye from the first and second regions, and wherein the device further comprises:

a computer configured to determine the eye position of the user's eye including at least a gaze vector of the user's eye, from the captured back reflections from a pupil center position of the user's eye ascertained from the back reflection of the user's eye, and from a glint position of the user's eye ascertained from the back reflection of the user's eye.

4. The device as recited in claim 1, wherein the optical element forms a third spatial or temporal region in which, the optical element has a third optical function by which the infrared laser beam is focused on the iris of the user's eye, or on the center of the user's eye, or on the cornea of the user's eye, to generate a further glint, wherein the second region and the third region form focal points that are spatially separate from one another on the user's eye.

5. The device as recited in claim 1, wherein the optical element is configured as a controllable multifocal lens or varifocal lens.

6. The device as recited in claim 5, wherein the controllable multifocal lens or varifocal lens is configured such that the scanned infrared laser beam passing through the controllable multifocal lens or varifocal lens is focused during a scan in a forward scanning direction, and such that the scanned infrared laser beam remains collimated during a scan in a backward scanning direction.

7. The device as recited in claim 1, wherein the optical element is configured as a holographic optical element (HOE) segmented two-dimensionally at least into the two spatial regions.

8. The device as recited in claim 7, wherein at least two first spatial regions and at least two second spatial regions are distributed in the HOE, regularly, over the entire surface extent of the HOE.

9. The device as recited in claim 8, wherein the first spatial regions and the second spatial regions are distributed over the HOE in the manner of a checkerboard, or in a strip-shaped manner, or in a regular polygonal pattern, or in a hexagonal pattern, or in another area-filling repeat pattern.

10. The device as recited in claim 8, wherein the first spatial regions and the second spatial regions are configured to be delimited from one another.

11. A pair of smart glasses, comprising:

a device for monitoring an eye position of a user's eye in a virtual retinal display, including:

at least one laser projector configured at least to generate a collimated scanned infrared laser beam;

at least one optical system configured to optically guide the scanned infrared laser beam to the user's eye, the optical system includes an optical element configured for the scanned infrared laser beam to pass through or is configured for diverting the scanned infrared laser beam, wherein the optical element is configured to form a first spatial or temporal region in which, in an interaction with the infrared laser beam, the optical element has a first optical function by which the collimation of the infrared laser beam is maintained, to generate a bright pupil effect and/or a retina speckle pattern, and wherein the optical element is configured to form a second spatial or temporal region in which, in the interaction with the infrared laser beam, the optical element has a second optical function by which the infrared laser beam is focused on an iris of the user's eye, or on a center of the user's eye, or on a cornea of the user's eye, to generate a glint, wherein the at least one laser projector includes a laser feedback interferometry sensor configured to detect back reflections of the infrared laser beam from the user's eye, the laser feedback interferometry sensor being integrated in the laser projector, wherein the infrared laser beam is combined with at least one visible laser beam to form a joint laser beam pencil, the infrared laser beam being generated by an infrared laser diode integrated with or optically coupled to the visible laser beam.

12. A method for monitoring an eye position of a user's eye in a virtual retinal display, comprising the following steps:

generating a collimated scanned infrared laser beam using at least one laser projector;

guiding the scanned infrared laser beam to the user's eye via at least one optical system, wherein the optical system includes an optical element through which the scanned infrared laser beam passes or by which the scanned infrared laser beam is diverted;

wherein, when the scanned infrared laser beam passes through or is diverted by the optical element, the optical element has a first optical element by which the collimation of the laser beam is maintained in a first spatial or temporal region of the optical element to generate a bright pupil effect and/or a retina speckle pattern, and wherein when the scanned infrared laser beam passes through or is diverted by the optical element, the optical element has a second optical element by which the laser beam is focused on an iris of the user's eye, or on a center of the user's eye, or on a cornea of the user's eye, in a second spatial or temporal region of the optical element, to generate a glint; and evaluating a reflection signal reflected by the user's eye and including: i) the glint, and ii) as a bright pupil pattern and/or a retina speckle pattern, to ascertain the eye position of the user's eye including a gaze vector of the user's eye, wherein the at least one laser projector includes a laser feedback interferometry sensor configured to detect back reflections of the infrared laser beam from the user's eye, the laser feedback interferometry sensor being integrated in the laser projector, wherein the infrared laser beam is combined with at least one visible laser beam to form a joint laser beam pencil, the infrared laser beam being generated by an infrared laser diode integrated with or optically coupled to the visible laser beam.

* * * * *